United States Patent Office.

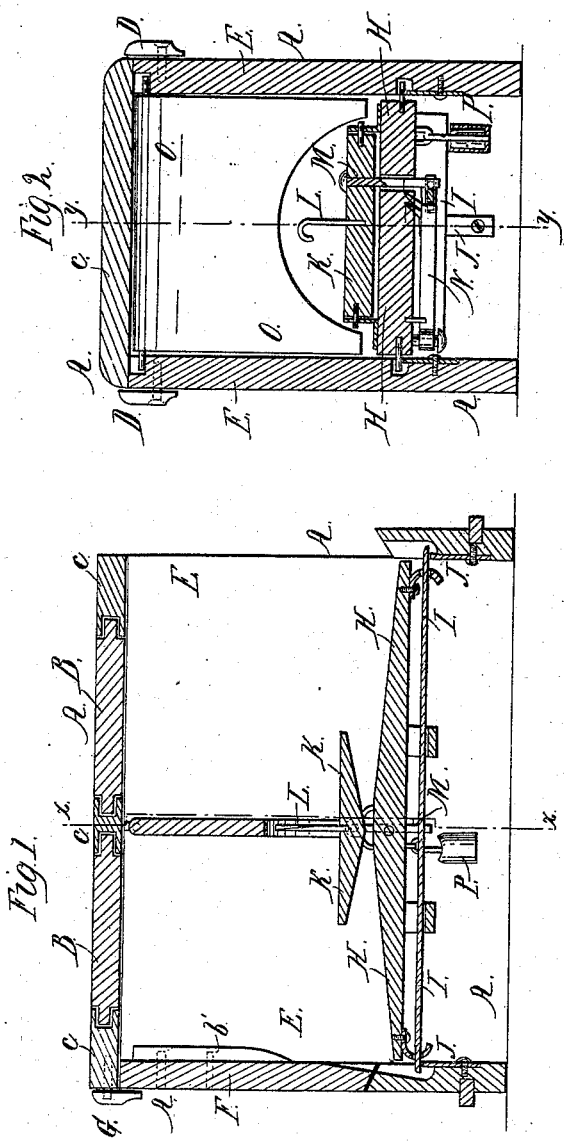

ISAAC N. CONNELL, OF SPENCER'S STATION, OHIO.

Letters Patent No. 67,959, dated August 20, 1867.

---

IMPROVEMENT IN ANIMAL TRAPS.

---

*The Schedule referred to in these Letters Patent and making part of the same.*

---

TO ALL WHOM IT MAY CONCERN:

Be it known that I, ISAAC N. CONNELL, of Spencer's Station, in the county of Guernsey, and State of Ohio, have invented a new and improved Rat-Trap; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved trap, taken through the line $y\,y$, fig. 2.

Figure 2 is a vertical cross-section of the same, taken through the line $x\,x$, fig. 1.

Similar letters of reference indicate like parts.

My invention has for its object to furnish an improved rat-trap simple in construction and effective in operation; and it consists in the combination of the trigger-plate, arm, and supporting bar or bolt with each other, and with the pivoted platform and frame of the trap; in the combination of a spring with the pivoted platform and supporting-bar or bolt; in the combination of an adjustable balance-weight with pivoted platform; in the combination of a removable pivoted partition with the frame or box of the trap; the whole being constructed and arranged as hereinafter more fully described.

A is the box of the trap, the top boards B of which are made with tongues upon their side edges, fitting into grooves in the edges of the stationary parts C of said top, and they are secured in place by the buttons D pivoted to the side boards E of the said box. One end of the box is left always open, the other end, F, is removable, and is kept in place by a button, G, as shown in fig. 1. The end board F is protected against lateral displacement by cleats $f'$ attached to its inner side. H is the platform of the trap, which is pivoted to the side boards E, as shown in fig. 2, so as to be removable when desired. The platform H is held steady by a long bar or bolt, I, the ends of which rest upon catches J attached to the ends of the trap, as shown in fig. 1. K is the trigger-plate, which is pivoted to ears attached to the upper side of the pivoted platform in the same vertical plane with its pivoting points. L is the bait-hook, which is attached to the upper side of the trigger-plate K in the same vertical plane with the pivoting points of said plate. M is an arm, the upper end of which is attached to the trigger-plate K in a line with its pivoting points. The arm M passes down through a slot in the platform H, and enters a notch or hole in the bar or bolt I, so that, as either end of the trigger-plate K is depressed the bolt I will be operated to release the corresponding end of the pivoted platform H, depositing the rat in the receptacle-box placed beneath. N is a spring, one end of which is attached to the under side of the platform H, and its other end enters a notch in the edge of the bar or bolt I, so as to bring the said bar back into proper position for supporting the platform as soon as it is released from the action of the trigger-plate K. P is the adjustable balance-weight, which is suspended from the under side of the pivoted platform H, nearly in a line with its pivoting points. The weight P is made adjustable by having a cavity formed in its upper part to receive shot or other heavy substances, so that the said weight may be made to balance or slightly overbalance the weight of the bait, so as to bring the said platform H back to its place after depositing the rat in the receiving-box. O is a partition, which is pivoted at its upper edge to the side boards E of the trap directly above the pivoting points of the trigger-plate K and platform H. The lower edge of the partition O is notched, as shown in the drawings, so that the partition and bait-hook may not interfere with each other. When it is desired to take the rats alive I generally prefer to close the end and top of the box A with the boards F and B, so that the rats may all be compelled to enter the same end of the trap, and may all be received into the same compartment of the receiving-box prepared for their reception, and placed beneath the box A. But when the rats are to be destroyed I fill the receiving-box with water to a sufficient depth, and remove the end and top boards F and B, and the pivoted partition O, converting the upper part of the trap into an open box. If desired, a flange or platform may be attached to each end of the trap for the rats to stand upon when entering the trap.

What I claim as new, and desire to secure by Letters Patent, is—

1. The combination and arrangement of the trigger-plate K, arm M, and supporting-bar or bolt I, with each other, and with the pivoted platform H and box A of the trap, substantially as herein shown and described and for the purpose set forth.

2. The combination of the spring N with the pivoted platform H and bar or bolt I, substantially as herein shown and described and for the purpose set forth.

3. The removable pivoted partition O and weight P, arranged in relation with the trigger-plate K, pivoted platform H, bar I, and trigger L, as herein set forth for the purpose specified.

ISAAC N. CONNELL.

Witnesses:
JOHN McDONALD,
NATHANIEL CONNELL.